United States Patent
Bergin et al.

(10) Patent No.: US 7,497,359 B2
(45) Date of Patent: *Mar. 3, 2009

(54) DOSING DEVICE

(75) Inventors: Cathleen A. Bergin, Hugo, MN (US);
John J. Dyer, Shoreview, MN (US);
Steven J. Maxa, Burnsville, MN (US);
Gary L. Olson, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/842,060

(22) Filed: May 10, 2004

(65) Prior Publication Data

US 2005/0029286 A1 Feb. 10, 2005

Related U.S. Application Data

(63) Continuation-in-part of application No. 10/072,512, filed on Feb. 7, 2002.

(51) Int. Cl.
*G01F 11/28* (2006.01)
(52) U.S. Cl. .................... 222/453; 222/424.5; 222/436; 222/153.01
(58) Field of Classification Search .......... 222/450, 222/453, 424.5, 425, 436, 454, 547, 548–549, 222/444, 451, 518, 153.01
See application file for complete search history.

(56) References Cited

U.S. PATENT DOCUMENTS

| | | |
|---|---|---|
| 23,008 A | 2/1859 | Bigelow |
| 295,009 A | 3/1884 | Hogan |
| 1,525,828 A | 2/1925 | Reeve |
| 1,565,686 A | 12/1925 | Titus |
| 1,698,732 A | 1/1929 | Pasnik |
| 2,067,523 A | 1/1937 | Finney |
| 2,248,958 A | 7/1941 | Christensen et al. |
| 2,366,343 A | 1/1945 | Ludwig |
| 2,532,787 A | 12/1950 | Romyns |
| 2,603,397 A | 7/1952 | Olson |
| 2,679,347 A | 5/1954 | Franz |
| 2,864,538 A | 12/1958 | Rasmussen |
| 2,902,250 A | 9/1959 | Bering |
| 2,980,302 A | 4/1961 | Rasmussen |
| 3,076,581 A | 2/1963 | Booth |
| 3,141,585 A * | 7/1964 | Emmert ...................... 222/434 |
| 3,232,498 A | 2/1966 | Bennett |
| 3,658,216 A | 4/1972 | Schwartzman |
| 3,666,150 A * | 5/1972 | Liljeholm .................. 222/453 |
| 3,738,543 A | 6/1973 | Aperlo |
| 3,865,281 A * | 2/1975 | Byrd et al. .................. 222/252 |

(Continued)

FOREIGN PATENT DOCUMENTS

DE 20004867 U1 12/2000

(Continued)

*Primary Examiner*—Frederick C. Nicolas
(74) *Attorney, Agent, or Firm*—David B. Patchett (57) ABSTRACT

A dosing device is described, in which a predetermined amount of a material such as a concentrated fluid can be dispensed from the device by finger pressure. In one embodiment, the device includes a shuttle that can move between first and second positions. In the second position, fluid can escape from a dosing chamber.

17 Claims, 5 Drawing Sheets

U.S. PATENT DOCUMENTS

| | | | |
|---|---|---|---|
| 4,036,407 A | 7/1977 | Slone | |
| 4,071,171 A | 1/1978 | Bassignani | |
| 4,109,829 A | 8/1978 | Kuckens et al. | |
| 4,174,057 A * | 11/1979 | Emery | 222/332 |
| 4,178,929 A | 12/1979 | Voegele | |
| 4,240,570 A | 12/1980 | Brown et al. | |
| 4,288,009 A | 9/1981 | Simmons | |
| 4,394,941 A | 7/1983 | Recine | |
| 4,427,041 A | 1/1984 | Coetzee | |
| 4,533,070 A | 8/1985 | Deininger et al. | |
| 4,679,714 A | 7/1987 | Blake | |
| 4,703,870 A * | 11/1987 | Sedam | 222/66 |
| 4,728,011 A | 3/1988 | Schuster et al. | |
| 4,756,433 A | 7/1988 | Lin | |
| 4,778,087 A | 10/1988 | Desai | |
| 4,807,785 A | 2/1989 | Pritchett | |
| 4,819,834 A | 4/1989 | Thiel | |
| 4,974,755 A | 12/1990 | Sonntag | |
| 5,000,353 A | 3/1991 | Kostanecki et al. | |
| 5,044,527 A | 9/1991 | Hickerson | |
| 5,085,351 A | 2/1992 | Martin | |
| 5,090,600 A * | 2/1992 | Clark | 222/492 |
| 5,092,497 A | 3/1992 | Toedter | |
| 5,097,991 A | 3/1992 | Lance | |
| 5,186,367 A | 2/1993 | Hickerson | |
| 5,234,134 A | 8/1993 | Raab et al. | |
| 5,407,104 A | 4/1995 | Santagiuliana | |
| 5,577,642 A | 11/1996 | Masek et al. | |
| 5,725,131 A | 3/1998 | Bell et al. | |
| 5,735,620 A | 4/1998 | Ford | |
| 5,826,748 A | 10/1998 | Qian et al. | |
| 5,836,299 A | 11/1998 | Kwon | |
| 6,131,774 A | 10/2000 | Thomas et al. | |
| 2003/0146246 A1 | 8/2003 | Arsenault et al. | |

FOREIGN PATENT DOCUMENTS

| | | |
|---|---|---|
| EP | 0 011 487 | 7/1982 |
| EP | 0 010 963 | 3/1983 |
| EP | 0 674 948 | 10/1995 |
| EP | 1356757 A | 10/2003 |
| EP | 1481626 A | 12/2004 |
| FR | 614623 A | 12/1926 |
| FR | 1 496 857 | 10/1967 |
| FR | 2 576 644 | 8/1985 |
| FR | 2735676 A1 | 12/1996 |
| GB | 619 616 | 3/1949 |
| GB | 2 206 860 | 1/1989 |

* cited by examiner

DOSING DEVICE

CROSS REFERENCE TO RELATED APPLICATIONS

This application is a continuation-in-part of U.S. Ser. No. 10/072,512, filed Feb. 7, 2002, now pending, the disclosure of which is herein incorporated by reference.

BACKGROUND

1. Technical Field

The present invention relates to a device for dispensing measured doses of a material, such as a concentrated liquid chemical formulation.

2. Background of the Invention

Some liquids are sold as concentrates that can be diluted with water before they are used. One example is cleaning concentrate, which can be diluted with water and then dispensed from a spray bottle, or taken from a pail or bucket and applied to the surface to be cleaned. Concentrates are much less expensive to ship and store than premixed liquids, and have gained wide acceptance in industries that use food services, janitorial supplies, and construction materials.

The use of concentrates is not without problems, however. If too much concentrate is used, then the cost per use is higher than necessary. If too little concentrate is used, the resulting mixture may not work as well as expected, and may cause the user to use or apply more of the mixture in an effort to make it work better. Accurate dosing is therefore important to both the user and the supplier of concentrated liquids.

Various types of proportioning devices have been used to dispense concentrated liquids. One such device is disclosed in U.S. Pat. No. 4,679,714 (Blake), which discloses a metering device for installation on the neck of a liquid product container so that, when the container is upended, actuation of the device results in the release of a pre-sized dose of the product. While this device may be useful for some purposes, such as dispensing laundry detergent, it may be less desirable for dispensing caustic chemicals that could irritate or harm a person's skin upon contact, because the user's hand is very close to the dispensing orifice.

The present invention is intended to overcome these and other disadvantages associated with conventional dispensing systems used to deliver materials such as concentrates.

BRIEF DESCRIPTION OF THE DRAWINGS

The present invention is described in more detail with reference to the attached drawings, in which.

DESCRIPTION OF THE INVENTION

In one embodiment, the dosing device of the present invention accurately dispenses a predetermined amount of a liquid when a push-button is actuated with finger pressure. The liquid flows from the dosing chamber by gravity, perhaps into a container where it can be diluted with water or another liquid. When the dosing chamber is empty, a user can reset the device, which permits the dosing chamber to be refilled. The device can be used to dispense various types of liquids including cleaning solutions, medicines, detergents, food products, mouthwash, and pharmaceuticals. These and other features of the present invention are described in greater detail below.

FIGS. 1 through 4 show one embodiment of a dosing device 100 according to the present invention. It includes a main chamber 105 formed by a body 110 and cap 120, and a dosing chamber 115 within the lower portion of body 110. The main chamber includes an upper opening 125, and the dosing chamber includes a lower opening 135. Cap 120 can be permanently secured to body 110 by, for example, spin or ultrasonic welding or an adhesive, or removably secured by threads or an interlocking engagement system. If the device is intended to be a unitary, single use device, then the cap is typically permanently secured to body 110. This may be desirable when, for example, the material held in the device is harmful, and should not be touched during for example a refilling operation. A device of this type may be designed so that it cannot be readily refilled once the liquid in the main chamber has been dispensed, meaning that there is no readily available way to refill the main chamber with liquid. If the device is intended to be refillable, then as noted above the cap may be removably secured to the body by, for example, threads or another sealable connection that can readily be disassembled or otherwise changed to permit refilling.

Figures 2, 2A:
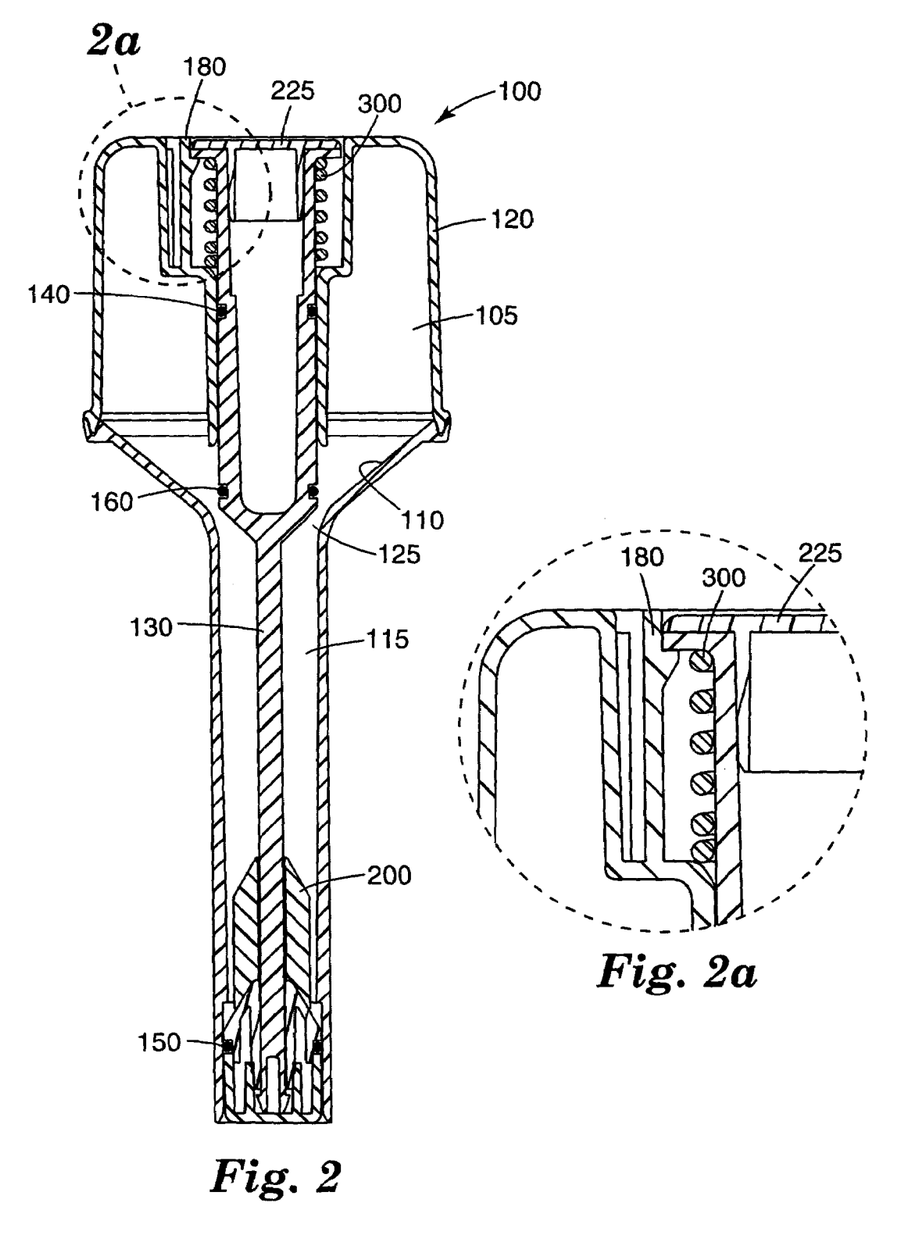
FIG. 2 is vertical cross-section through a dosing device according to the present invention with the device in a first state.
FIG. 2a is an enlarged vertical cross-sectional view taken from FIG. 2, as shown.

A plunger or shuttle 130 fits within the body, and passes through the upper opening 125 and the lower opening 135, as shown in FIG. 2. In the illustrated embodiment, the uppermost portion of the shuttle does not project beyond the top surface of cap 120, and thus the device should not dispense the liquid when pressure is applied inadvertently to the top of the device. In the illustrated embodiment, the arrangement of the components also prevents a person from returning the shuttle to the first position by grasping the top of the shuttle, though that is not a required feature of the invention. This feature may be useful because it can decrease the incidence of repeated dosing, which can be undesirable for reasons previously described. Upper seal 140 and lower seal 150 prevent fluid contained in either the main chamber or the dosing chamber from escaping from the device unintentionally, by sealing against the inner surfaces of body 110 and 120 in the manner shown. The particular arrangement of the seals and the surfaces against which they seal depends on the design of the device. Shoulder seal 160 is also provided, and when the device is in a first state with the shuttle in a first position, as shown in FIG. 2, it preferably does not seal against another surface. In this condition, fluid can move freely between the main chamber and the dosing chamber, and thus the dosing chamber can be filled with fluid or any other material held in the main chamber.

Figure 3:
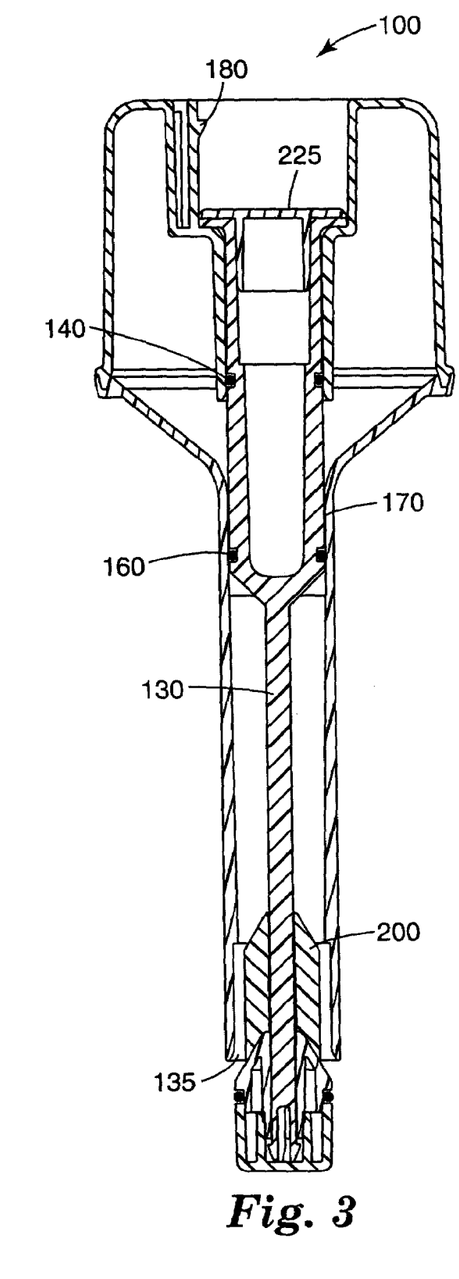
FIG. 3 is a vertical cross-section through the dosing device of FIG. 2, with the device in a third state.

FIG. 3 illustrates a second state of the device in which the shuttle 130 is in a second position and a measured dose of fluid is dispensed through lower opening 135. Upper seal 140 continues to seal the upper opening. Shoulder seal 160 seals against shoulder 170 of the body, which prevents any additional fluid from flowing from the main chamber into the dosing chamber while the shuttle is in the second position. When the measured dose has been released from the device, the lower end of shuttle 130 can be pressed back into its first position within the device (for example by pressing it against a hard surface), which returns the device to its first state so that the dosing chamber may be refilled. In another embodiment, the bottom of the device can be adapted so that the shuttle can only be returned to the first position when it is acted on by another specially adapted device, which then requires the user to remove the dosing device from a bottle or the like before activating it again. This adaptation may include providing an expanding end on the shuttle so that the end of the device must be inserted into a customized passageway (for example on a caddy or carrier) that compresses the end of the shuttle so that it can be returned to the first position. Because the main chamber may hold several doses of liquid, or even dozens or hundreds of doses, the device can dispense several or many measured doses sequentially before it must either be refilled or discarded.

Figure 3A:
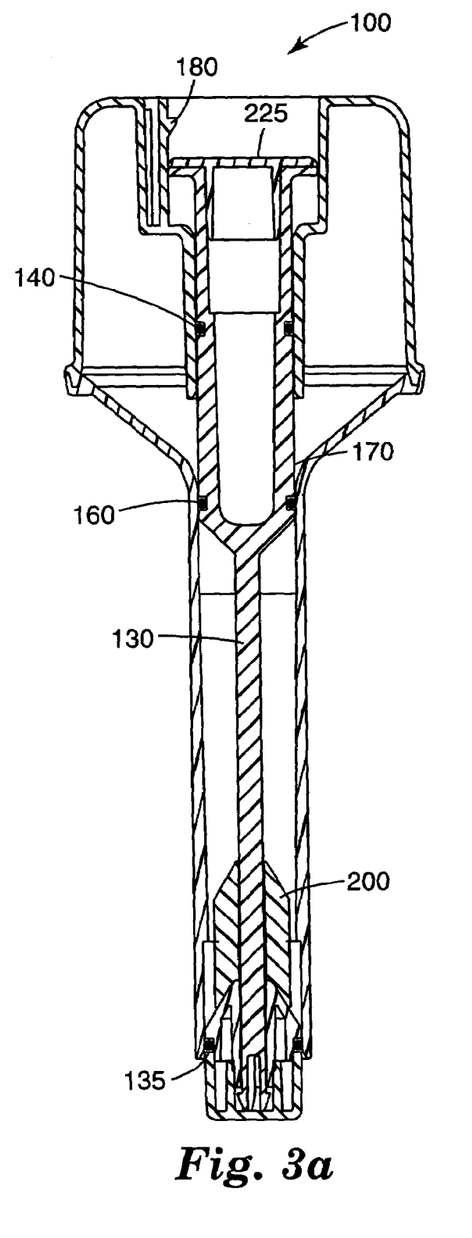
FIG. 3a is a vertical cross-section through the dosing device of FIG. 2, with the device in a third state.
Figure 4:
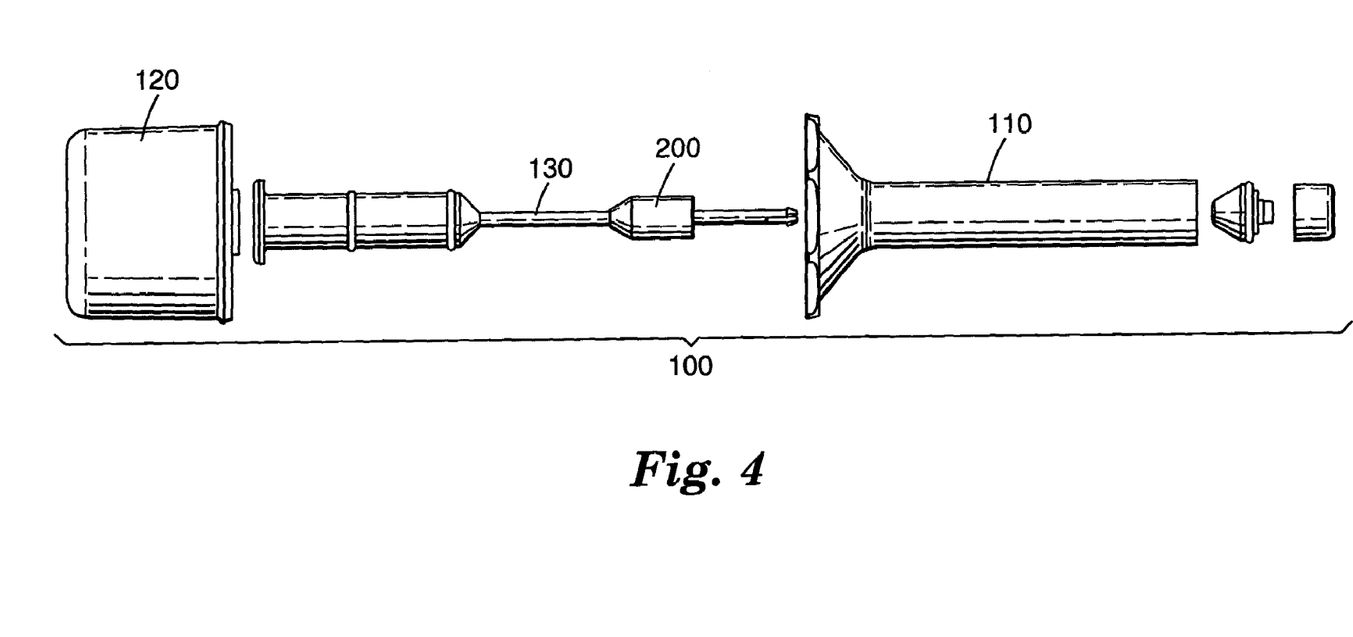
FIG. 4 is a side exploded view of a dosing device according to the present invention.
Figure 5:
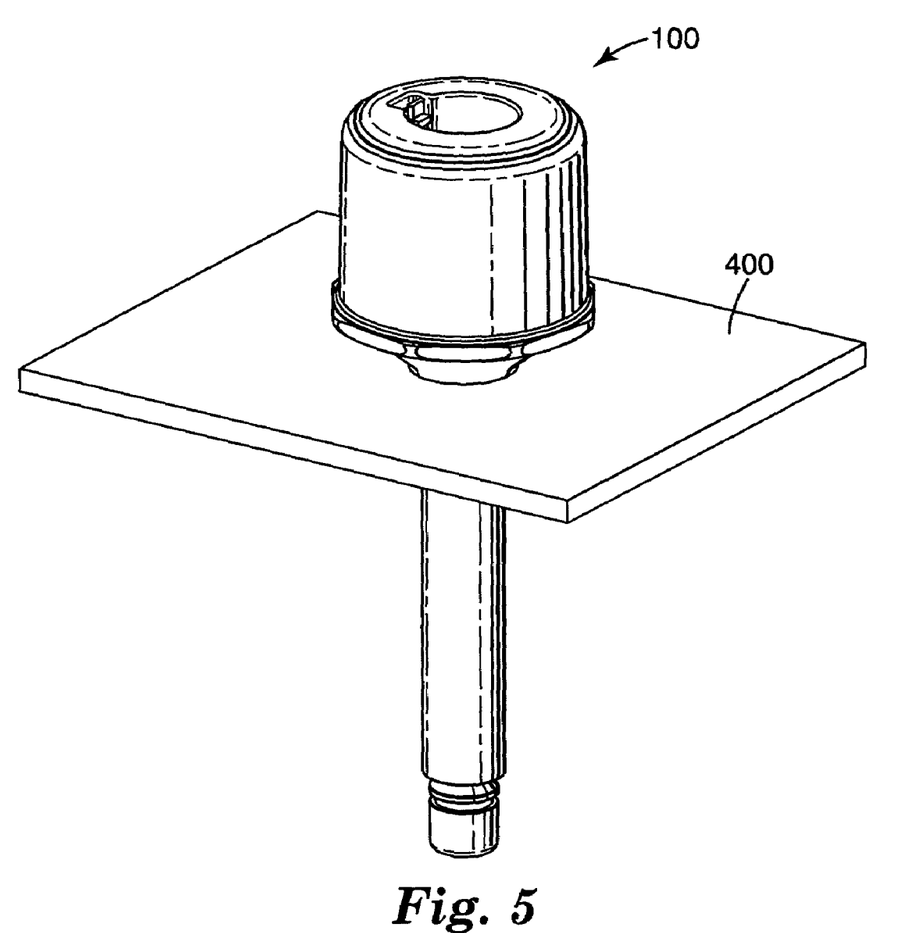
FIG. 5 is a view of a dosing device held within a carrier tray.

In the embodiment just described, the device includes a buffer, meaning that there is at least some distance through which the shuttle travels when no material can flow from the main chamber into the dosing chamber (or vice versa), and no material can flow out of the dosing chamber (see FIG. 3a). This buffering system is advantageous for reasons that may not be self-evident. In the absence of a buffering system, the tolerances of the various components must be very, very small because if they are not, there may be at least one position in the travel of the shuttle where material flows from the main chamber into the dosing chamber and flows out of the dosing chamber. This can empty the entire device in a single actuation, usually unintentionally, and the result would be at least annoying, and perhaps dangerous. Devices of the present invention that include this buffering feature may be referred to as "buffered" devices. Buffered devices thus more reliably dispense a single dose, and only a single dose, during each actuation.

A number of additional features of the present invention may also be used if desired. One is the use of an optional volumetric spacer 200 that can be placed within dosing chamber 115 to reduce the volume of space available for fluid within the dosing chamber. Thus, for example, if the dosing chamber would otherwise hold 15 ml of fluid, but only 5 ml of fluid should be dispensed with each dose, a volumetric spacer having a volume of 10 ml can be placed within the dosing chamber so that the volume available for the fluid is only 5 ml. The volumetric spacer can be any appropriate size, and in the illustrated embodiment it has a passage through the middle of which a portion of shuttle can be received. The spacer shown utilizes a geometry that permits rapid evacuation of the material being dispensed and minimal residual material left behind to ensure accurate dosing, and minimal residue remaining in the chamber when resetting the dosing chamber. The size, shape, and composition of the main chamber, the dosing chamber, and any volumetric spacer can be adapted to accommodate the particular liquids to be dispensed, as can the other components of the device.

Although the shuttle is preferably unbiased, meaning that it is not urged toward either the first or the second position, in one embodiment the shuttle is biased toward the first position (preferably by a spring 300). Then, when the shuttle is in the second position and the user releases pressure on the top portion of the shuttle, the shuttle returns to the first position and the dosing chamber is refilled. This enables the user to dispense an additional dose immediately. It can be disadvantageous, however, because repeated dosing is simple and thus more likely.

Another useful feature is a locking mechanism associated with the shuttle, the use of which prevents the shuttle from being moved from the first position to the second position until it is released. One embodiment of such a locking mechanism is shown in FIGS. 2 and 2a, in which a spring-arm 180 is molded into cap 120, and is biased toward the shuttle. In its normal position, the spring-arm interferes with the movement of the shuttle, but when moved radially away from the shuttle (toward the left, in FIGS. 2 and 2a), permits the shuttle to be moved toward the second position. This prevents inadvertent dispensation of material from the device, and in other embodiments with known design characteristics may qualify as a child-proof safety feature. Because of the design of the device, at least in the embodiment shown, material can be dispensed from the device without having a user's fingers near the point at which the material is dispensed, which results in a safer product. Stated another way, the activation location (where the user depresses the upper end of the shuttle, as shown at 225 in FIGS. 2 and 3) is on the opposite end of the device, and thus is spaced away from, the dispensation location (where material exits the dosing chamber). It should also be noted that the device of the present invention is self-contained, or unitary, and is not necessary for it to be screwed onto or otherwise affixed to a standard spray or other bottle, as are other known dispensing systems.

The particular materials used in the manufacture of the components of the present invention may be selected to fit the application to which the device is expected to be used. One useful consideration is that the materials should be selected so that they do not degrade when exposed to the liquids expected to be dispensed by the device, or by UV light, the passage of time, or any other environmental factors. For example, plastic and/or metal may be used for the main chamber (body and cap), the dosing chamber, the shuttle, and the volumetric spacer components of the dosing device. Various seal materials could be used depending on the severity of the fluid, the precision of the processes that make the mating parts, and the friction required to overcome the seals in order to move the shuttle from position to position. One potentially suitable material for the seals is an ethylene-propylene O-ring available from Apple Rubber Products under the designation AS568-014. Another type of seal believed to be useful with the device of the present invention is a U-cup seal, such as the ones available from C&C Packings, Inc. under the designation 014 Bunya N70 U-cup 5. Cup seals may offer less resistance to sliding motion, and may be directional so that the proper orientation of the seal can be important. Yet another type of seal believed to be useful with the device of the present invention is a quad ring seal, such as the ones available from RT Enterprises under the designation Quattro Seal 400-014. Combinations of seal materials could also be used. In addition, sealing can be obtained by sizing the mating surface of the components with a slight interference or with slightly raised rings molded integral to the sliding member. The diameters of the shaft where the seals are located are preferably the same, so that the volume of the dosing chamber does not change when the device is activated. Also, because the upper and lower seals are in use much more than the middle seal, they may be designed using superior materials.

Other advantages of the dosing device of the present invention include the fact that it preferably does not include any type of motor or power source, that it can safely be inverted, dropped, rolled, or otherwise moved without spilling the liquid, and that it does not rely on methods of activation (such as squeezing a bottle or container) that can be non-uniform and therefore inaccurate.

The dosing device of the present invention may be shipped and sold either full or empty, and if sold while full, can be either refillable, or reuseable for so long as there is enough liquid in the main chamber to fill the dosing chamber. One way to provide a refillable dosing device is to thread the connection between the cap 120 and the body 110, so that the cap can be removed for refilling. The fluids used with the present device are preferably ones that readily flow due simply to gravitational forces, but other more viscous fluids could be dispensed with some modifications to the device. For example, the shuttle could pass further out of the lower opening of the device to permit easier exit of liquid from the device. Accordingly, although the present invention has been described primarily with reference to liquids, more viscous materials and even powders, pastes, and solid pellets may also be used if they flow sufficiently to enable them to fill the dosing chamber and subsequently exit the device. Fluids that may be used with the device of this invention include, but are not limited to, cleaning chemicals and concentrates, protective chemicals, detergents, food products, mouthwash, pharmaceuticals, food service products, animal care products, automotive materials, construction materials, adhesives, and personal hygiene materials such as hand creams and lotions.

Other optional features of the dosing device of the present invention include the following. The shape of the outside of the housing can be designed so that only that dosing device fits into a bottle having a complementary-shaped neck. This can be done by providing a key on one device and a keyway on the other, or by other known methods. This can be particularly useful for matching up a set of bottles with a set of dosing devices, so that they provide a comprehensive system. In another embodiment, the lower-most portion of the device could be slightly pointed, so that any drops of liquid would collect and then drip off that point instead of remaining on the bottom of the device. In another embodiment, some or all of the interior surfaces of the device could be coated with an appropriate coating to facilitate the draining of the contents of the device.

The appropriate amount of concentrate or liquid can be determined by the manufacturer or user. If, for example, the dosing device is sold or commonly used with a dispenser, such as a 0.95 liter (32 ounce) spray bottle, then the dose size can be determined by knowing the concentration of the liquid that, when diluted by another liquid such as water, will yield 0.95 liters (32 ounces) of liquid.

The dosing device of the present invention may be sold or used with a carrier that includes spaces for one or more dosing devices, one or more containers such as spray bottles, cleaning tools, and other supplies that may be used in connection with the dosing device.

Figure 1:
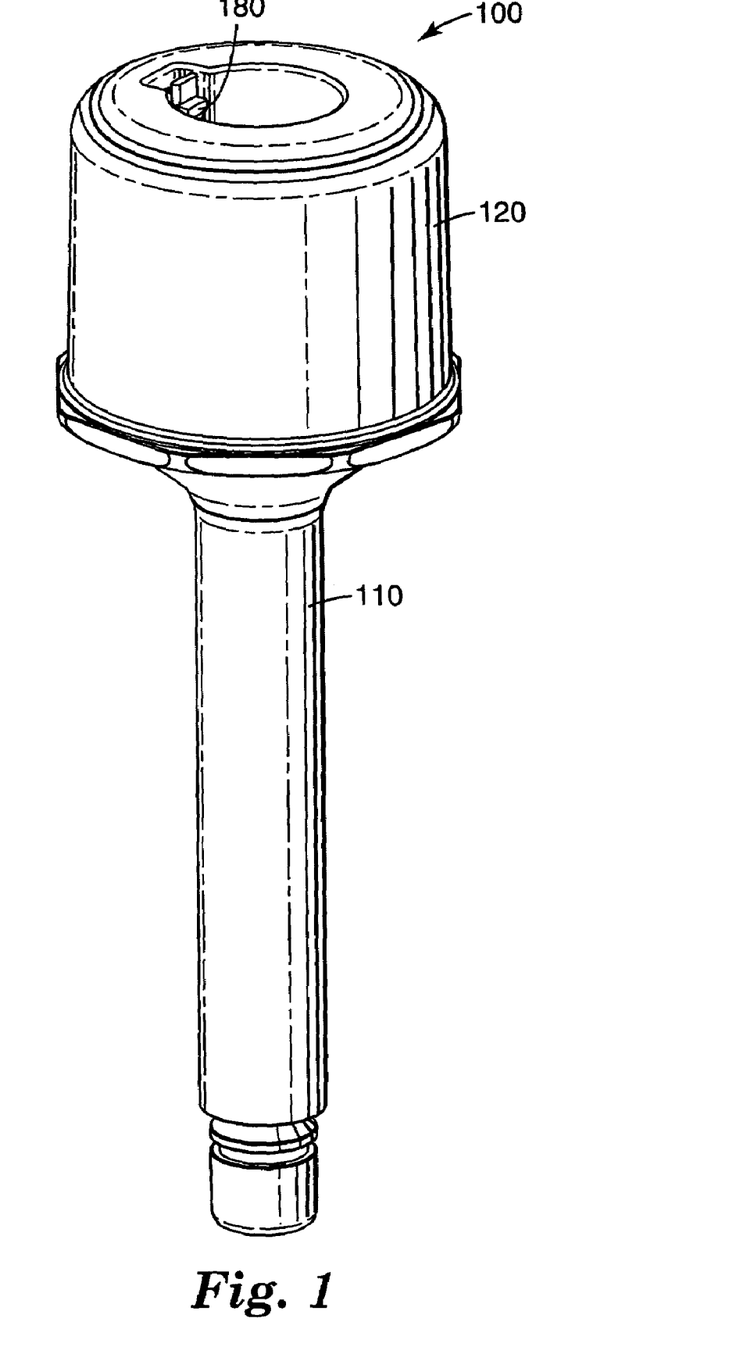
FIG. 1 is a slightly elevated side view of a dosing device according to the present invention.

The present invention has now been described with reference to several embodiments thereof. It will be apparent to those skilled in the art that many changes can be made in the embodiments described without departing from the scope of the present invention. Not all of the portions of the overall design shown in, for example, FIG. 1 are required. Thus the scope of the present invention should not be limited to the structures described in this application, but only by structures described by the language of the claims and the equivalents of those structures.

What is claimed is:

1. A buffered dosing device for a material, comprising:
   a main chamber formed within a body, the main chamber comprising an annular volume sized to hold more than one dose of the material, wherein the body defines an interior passage through an interior of the annular volume of the main chamber;
   a dosing chamber sized to hold one dose of the material, in fluidic communication with the main chamber;
   a shuttle comprising an uppermost portion located within the interior passage of the body and a lower portion located within the dosing chamber, wherein the shuttle is adapted for movement between:
   (i) a first position in which the material can flow between the main chamber and the dosing chamber;
   (ii) a second position in which the shuttle is depressed and seals the dosing chamber from the main chamber, and permits the material to exit the dosing chamber;
   (iii) a third position intermediate the first and second positions, in which no material can flow between the main chamber and the dosing chamber, and no material can escape from the dosing chamber; and
   a locking mechanism that prevents the shuttle from being moved from the first position to the second position until the locking mechanism is released.

2. A dosing device according to claim 1, wherein the locking mechanism comprises locked position in which a spring arm is biased toward the uppermost portion of the shuttle to interfere with movement of the shuttle, and an unlocked position in which the spring arm does not interfere with movement of the shuttle.

3. The dosing device of claim 1, wherein the main chamber is refillable.

4. The dosing device of claim 3, wherein the main chamber may be refilled by removing a cap that forms at least a portion of the main chamber.

5. The dosing device of claim 1, in combination with a carrier tray.

6. The dosing device of claim 1, wherein the device includes a volumetric spacer within the dosing chamber.

7. The dosing device of claim 1, in combination with liquid in at least one of the main chamber and the dosing chamber.

8. A dosing device according to claim 1, wherein the shuttle comprises an activation location that is disposed at an opposite end of the dosing device from a dispensation location where the material exits the dosing device.

9. A dosing device for a material, the dosing device comprising:
   a body comprising a main chamber and a dosing chamber, wherein the dosing chamber is located in an lower portion of the body, wherein the main chamber comprises an annular volume sized to hold more than one dose of the material, wherein the body defines an interior passage through an interior of the annular volume of the main chamber;
   wherein the dosing chamber is sized to hold one dose of the material, wherein the dosing chamber is in fluidic communication with the annular volume of the main chamber;
   a shuttle comprising an uppermost portion located within the interior passage of the body and a lower portion located within the dosing chamber, wherein the shuttle is adapted for movement between:
   a first position in which the material can flow between the main chamber and the dosing chamber; and
   a second position in which the shuttle is depressed and seals the dosing chamber from the main chamber, and permits the material to exit the dosing chamber;
   a sping located within the interior passage of the body, wherein the spring biases the shuttle in the first position;
   a locking mechanism that prevents the shuttle from being moved from the first position to the second position until the locking mechanism is released.

10. The dosing device of claim 9, wherein the locking mechanism comprises locked position in which a spring arm is biased toward the uppermost portion of the shuttle to interfere with movement of the shuttle, and an unlocked position in which the spring arm does not interfere with movement of the shuttle.

11. The dosing device of claim 9, wherein the shuttle is adapted for movement to a third position intermediate the first and second positions, wherein the material cannot flow between the main chamber and the dosing chamber and the material cannot escape from the dosing chamber when the shuttle is in the third position.

12. The dosing device of claim 9, wherein the main chamber is refillable.

13. The dosing device of claim 9, wherein the main chamber may be refilled by removing a cap that forms at least a portion of the main chamber.

14. The dosing device of claim 9, in combination with a carrier tray.

15. The dosing device of claim 9, wherein the dosing device includes a volumetric spacer within the dosing chamber.

16. The dosing device of claim 9, in combination with liquid in at least one of the main chamber and the dosing chamber.

17. The dosing device of claim 9, wherein the shuttle comprises an activation location that is disposed at an opposite end of the dosing device from a dispensation location where the material exits the dosing device.

* * * * *